United States Patent
Ishii et al.

(10) Patent No.: US 7,312,745 B2
(45) Date of Patent: Dec. 25, 2007

(54) RADAR

(75) Inventors: Toru Ishii, Hirakata (JP); Motoi Nakanishi, Nagaokakyo (JP)

(73) Assignee: Murata Manufacturing Co., Ltd (JP)

( * ) Notice: Subject to any disclaimer, the term of this patent is extended or adjusted under 35 U.S.C. 154(b) by 28 days.

(21) Appl. No.: 10/584,256

(22) PCT Filed: Nov. 8, 2004

(86) PCT No.: PCT/JP2004/016530

§ 371 (c)(1),
(2), (4) Date: Jun. 23, 2006

(87) PCT Pub. No.: WO2005/066654

PCT Pub. Date: Jul. 21, 2005

(65) Prior Publication Data

US 2007/0153255 A1    Jul. 5, 2007

(30) Foreign Application Priority Data

Jan. 7, 2004    (JP) .............................. 2004-002145

(51) Int. Cl.
    G01S 13/34    (2006.01)
(52) U.S. Cl. .................................... 342/109
(58) Field of Classification Search ................ 342/70, 342/109, 112
    See application file for complete search history.

(56) References Cited

U.S. PATENT DOCUMENTS

| | | | | |
|---|---|---|---|---|
| 5,652,589 A | * | 7/1997 | Ono et al. ...................... | 342/70 |
| 5,751,240 A | * | 5/1998 | Fujita et al. ................... | 342/70 |
| 6,072,422 A | * | 6/2000 | Yamada ........................ | 342/70 |
| 6,121,917 A | * | 9/2000 | Yamada ....................... | 342/109 |
| 6,204,803 B1 | * | 3/2001 | Uehara ......................... | 342/70 |
| 6,573,859 B2 | * | 6/2003 | Tokoro ......................... | 342/70 |
| 6,674,393 B2 | * | 1/2004 | Kishida ......................... | 342/70 |
| 6,690,319 B2 | * | 2/2004 | Matsui et al. .................. | 342/70 |
| 7,034,743 B2 | * | 4/2006 | Nakanishi et al. ........... | 342/109 |
| 7,034,745 B2 | * | 4/2006 | Isaji ............................ | 342/109 |
| 7,061,424 B2 | * | 6/2006 | Kuroda et al. ................ | 342/70 |
| 7,151,482 B2 | * | 12/2006 | Natsume et al. ............ | 342/195 |
| 7,196,658 B2 | * | 3/2007 | Inatsune ..................... | 342/195 |
| 7,242,344 B2 | * | 7/2007 | Mitsumoto ................... | 342/70 |
| 2002/0180633 A1 | * | 12/2002 | Nakanishi et al. ............ | 342/70 |
| 2003/0048216 A1 | * | 3/2003 | Kishida ......................... | 342/70 |
| 2003/0122702 A1 | * | 7/2003 | Kishida et al. ............... | 342/70 |
| 2003/0128156 A1 | * | 7/2003 | Kishida ......................... | 342/195 |
| 2004/0125010 A1 | * | 7/2004 | Natsume et al. ............. | 342/70 |

(Continued)

FOREIGN PATENT DOCUMENTS

JP    04-343084    11/1992

(Continued)

Primary Examiner—Daniel Pihulic
(74) Attorney, Agent, or Firm—Dickstein, Shapiro, LLP.

(57) ABSTRACT

A radar wherein, in accordance with a peak frequency f1[t−nT] of a first projecting portion at a predetermined timing t−nT, a center frequency fr[t] of peak frequencies of first and second projecting portions at a current measurement timing t is predicted, and f1[t] and f2[t] in which (f1[t]+f2[t])/2 approximates the predicted fr[t] is extracted as a pair candidate. In addition, f1[t] and f2[t] in which Doppler shift frequency is substantially equal to a Doppler shift frequency calculated from the peak frequency f1[t−nT] of the first projecting portion and the peak frequency f2[t−nT] of the second projecting portion are selected.

10 Claims, 8 Drawing Sheets

U.S. PATENT DOCUMENTS

| | | | |
|---|---|---|---|
| 2004/0183719 A1* | 9/2004 | Natsume et al. | 342/147 |
| 2004/0222919 A1* | 11/2004 | Isaji | 342/70 |
| 2005/0156780 A1* | 7/2005 | Bonthron et al. | 342/70 |
| 2005/0165567 A1* | 7/2005 | Inatsune | 702/66 |
| 2007/0153255 A1* | 7/2007 | Ishii et al. | 356/28 |

FOREIGN PATENT DOCUMENTS

JP           06-094829      4/1994

* cited by examiner

RADAR

FIELD OF THE INVENTION

The present invention relates to radars detecting targets by transmitting and receiving radio waves obtained by performing frequency modulation on continuous waves.

BACKGROUND OF THE INVENTION

FM-CW radars utilizing millimeter waves have been developed, for example, as in-vehicle radars. FM-CW radars detect targets by transmitting and receiving radio waves obtained by performing frequency modulation (FM) on continuous waves (CW). In other words, FM-CW radars transmit a transmission signal repeating an upstream-modulation section in which a frequency gradually increases and a downstream-modulation section in which the frequency gradually decreases, receive a reception signal including a reflection signal from a target, and calculate the relative distance and the relative speed of the target in accordance with a frequency spectrum of a beat signal, which is a signal indicating the frequency difference between the transmission signal and the reception signal. Since, normally, the relative position and relative speed of a target is not constant, the above-mentioned operations are repeated at a constant frequency in order to acquire the relative position and relative speed of the target every time the operations are performed. Since targets are distributed within a detection azimuth range, directions of the targets within the detection azimuth range can be calculated by performing the above-mentioned operations for a beam facing toward a predetermined direction and by sequentially changing the beam direction.

When a single target exists, a single projecting portion appears in a frequency spectrum of a beat signal based on a reflection wave from a target in each of an upstream-modulation section and a downstream-modulation section. Thus, the peak frequency of the projecting portion of each of the beat signal in the upstream-modulation section (hereinafter, referred to as an "upbeat signal") and the beat signal in the downstream-modulation section (hereinafter, referred to as a "downbeat signal") is calculated, and the relative distance and the relative speed of the target are calculated from the two peak frequencies.

However, when a plurality of targets exists in substantially the same direction, a plurality of projecting portions appears in a frequency spectrum of each of an upbeat signal and a downbeat signal of an identical beam. Thus, it is necessary to determine, from among the plurality of projecting portions, which combination of projecting portions is generated due to the existence of an identical target (hereinafter, referred to as "pairing"). However, as the number of detected projecting portions increases, it takes a longer time to perform pairing. In addition, since the number of combinations increases, there is a larger possibility to perform wrong pairing. Thus, there are a problem in that the number of targets that can be detected within a limited period of time is limited, a problem in that providing an arithmetic processing unit capable of performing a high-speed arithmetic operation in order to detect many targets increases cost, and a problem in that it is difficult to acquire accurate relative distance and speed when wrong pairing is performed.

In order to avoid the above-described problems, actual radars increase the accuracy by performing filtering processing in which context is taken into consideration so as not to depend only on a single pairing operation. However, it is important not to perform wrong pairing from the beginning.

Thus, as disclosed in patent document 1, pairing is performed by regarding a combination of projecting portions appearing in a frequency spectrum of a reception signal, intensities of the projecting portions being substantially equal to each other, as being caused by an identical target.

In addition, a technology for setting the gradient of upstream modulation and the gradient of downstream modulation such that a moving distance by the amount corresponding to a Doppler shift frequency corresponds to a moving distance by relative speed at a predicted time in the future is disclosed in patent document 2. With this arrangement, distance can be calculated without performing pairing.

Patent Document 1: Japanese Unexamined Patent Application Publication No. 4-343084

Patent Document 2: Japanese Unexamined Patent Application Publication No. 6-94829

However, in the method described in patent document 1, if a plurality of projecting portions whose reception signal intensities are substantially equal to each other appears, a combination of a pair of projecting portions may not be determined.

In addition, in the method described in patent document 2, although pairing is not necessary for calculating distance, relative speed cannot be calculated.

SUMMARY OF THE INVENTION

Thus, it is an object of the present invention to solve the problems mentioned above and to provide a radar that is capable of performing pairing easily and calculating relative speed.

In a radar that transmits a transmission signal alternately repeating an upstream-modulation section in which a frequency gradually increases and a downstream-modulation section in which the frequency gradually decreases, that receives a reception signal serving as a reflection signal of the transmission signal reflected from a target, that acquires data on a frequency spectrum of a beat signal for the transmission signal and the reception signal, that performs pairing, from among a plurality of first projecting portions appearing in the frequency spectrum of the beat signal in the upstream-modulation section and a plurality of second projecting portions appearing in the frequency spectrum of the beat signal in the downstream-modulation section, and that detects a relative distance and a relative speed in accordance with frequencies of two projecting portions forming the pair, a center frequency (that is, a component based on a range delay) of peak frequencies of first and second projecting portions at a timing a certain period of time after a predetermined timing is predicted in accordance with a peak frequency of a first projecting portion at the predetermined timing, and a pair of projecting portions acquired at the timing after the certain period of time is extracted in accordance with the center frequency.

In addition, a center frequency of peak frequencies of first and second projecting portions at a timing a certain period of time before a predetermined timing is predicted in accordance with a peak frequency of a second projecting portion at the predetermined timing, and a pair of projecting portions acquired at the timing before the certain period of time is extracted in accordance with the center frequency.

In addition, the pair of projecting portions is extracted by using, as the certain period of time, nT satisfying a relationship, $nT \approx fo/(2\Delta F \cdot fm)$ (here, n represents a desired natural number), where T represents a measurement cycle in which the frequency analysis is performed, 1/fm represents a modulation cycle serving as a cycle including the upstream-modulation section and an adjacent downstream-modulation section, fo represents a center frequency of the transmission signal, and ΔF represents a width of a frequency shift in the upstream-modulation section and the downstream-modulation section.

In addition, a center frequency of peak frequencies of first and second projecting portions at a predetermined timing is predicted by using a peak frequency of a first projecting portion at a timing a certain period of time before the predetermined timing and a peak frequency of a second projecting portion at a timing the certain period of time after the predetermined timing, and a pair of projecting portions acquired at the predetermined timing is extracted in accordance with the center frequency.

When a second projecting portion forming a pair with the first projecting portion at the timing before the certain period of time that is used for predicting the center frequency at the predetermined timing and that exhibits a frequency difference substantially equal to a difference between the peak frequencies of the first and second projecting portions forming the pair at the predetermined timing does not exist and/or when a first projecting portion forming a pair with the second projecting portion at the timing after the certain period of time that is used for predicting the center frequency at the predetermined timing and that exhibits the frequency difference does not exist, a combination of the first and second projecting portions at the predetermined timing is excluded from pair candidates.

A center frequency (that is, a component based on a range delay) of peak frequencies of first and second projecting portions at a timing a certain period of time after a predetermined timing is predicted in accordance with a peak frequency of a first projecting portion at the predetermined timing, and a pair of projecting portions acquired at the timing after the certain period of time is extracted in accordance with the center frequency. Thus, pairing can be performed easily, and it is less likely to cause wrong pairing. Therefore, relative distance and speed can be calculated accurately. In addition, since the amount of calculation necessary for pairing is reduced, the number of targets that can be detected per unit time is increased. Thus, a cycle of detection can be shortened.

In addition, a center frequency (that is, a component based on a range delay) of peak frequencies of first and second projecting portions at a timing a certain period of time before a predetermined timing is predicted in accordance with a peak frequency of a second projecting portion at the predetermined timing, and a pair of projecting portions acquired at the timing before the certain period of time is extracted in accordance with the center frequency. Thus, pairing can be performed easily, and it is less likely to cause wrong pairing. Therefore, relative distance and speed can be calculated accurately. In addition, since the amount of calculation necessary for pairing is reduced, the number of targets that can be detected per unit time is increased. Thus, a cycle of detection can be shortened.

In addition, the pair of projecting portions at the predetermined timing is extracted by using, as the certain period of time, nT satisfying a relationship, nT≈fo/(2ΔF·fm) in which n represents a desired natural number, where T represents a measurement cycle, 1/fm represents a modulation cycle serving as a cycle including the upstream-modulation section and an adjacent downstream-modulation section, fo represents a center frequency of the transmission signal, and ΔF represents a width of a frequency shift in the upstream-modulation section and the downstream-modulation section. Thus, the pair of projecting portions acquired at the predetermined timing can be extracted from a peak frequency of a first projecting portion at measurement n times before the predetermined timing or from a peak frequency of a second projecting portion at measurement n times after the predetermined timing.

In addition, a center frequency of peak frequencies of first and second projecting portions at a predetermined timing is predicted by using a peak frequency of a first projecting portion at a timing a certain period of time before the predetermined timing and a peak frequency of a second projecting portion at a timing the certain period of time after the predetermined timing, and a pair of projecting portions acquired at the predetermined timing is extracted in accordance with the center frequency. Thus, even in a case where the relationship nT≈fo/(2ΔF·fm) is not satisfied or even in a case where an error occurs from the relationship, a predicted error of a center frequency is canceled. Thus, the accuracy of pairing can be increased.

When a second projecting portion forming a pair with the first projecting portion at the timing before the certain period of time that is used for predicting the center frequency of the peak frequencies of the first and second projecting portions at the predetermined timing and that exhibits a frequency difference substantially equal to a difference between the peak frequencies of the first and second projecting portions forming the pair at the predetermined timing does not exist and/or when a first projecting portion forming a pair with the second projecting portion at the timing after the certain period of time that is used for predicting the center frequency at the predetermined timing and that exhibits the frequency difference does not exist, a combination of the first and second projecting portions at the predetermined timing is excluded from pair candidates. Thus, the number of pair candidates can be reduced quickly, and pairing can be performed more quickly. In addition, it is less likely to cause wrong pairing.

REFERENCE NUMERALS

1—RF block
2—signal processing block
3—dielectric lens
4—primary radiator
5—circulator
6—coupler
7—isolator
8—VCO
9—mixer
13—digital signal processor
14—microprocessor
16—scan unit

DETAILED DESCRIPTION OF THE INVENTION

Figure 1:
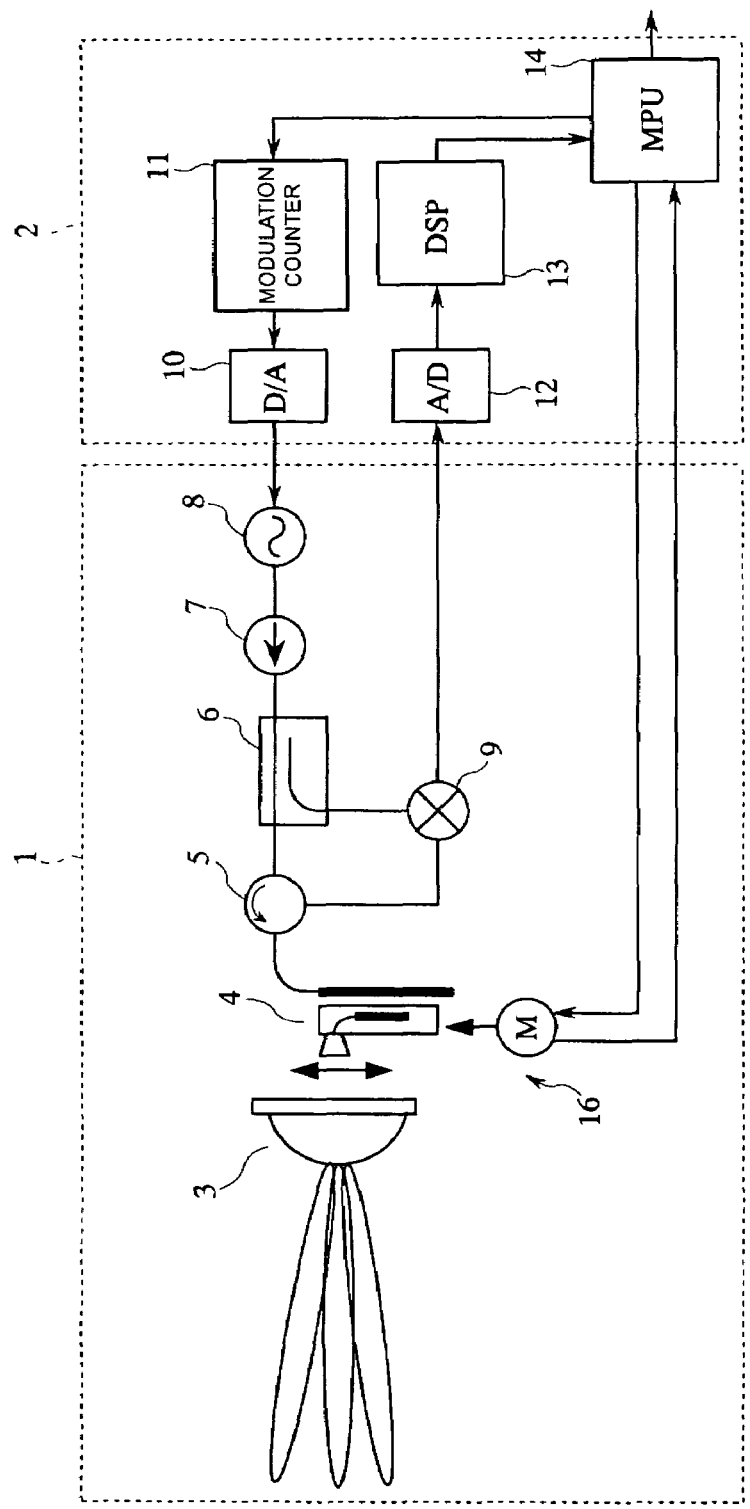
FIG. 1 is a block diagram showing a structure of a radar.

FIG. 1 is a block diagram showing the structure of a radar according to an embodiment of the present invention.

As shown in FIG. 1, the radar includes an RF block 1 and a signal processing block 2. The RF block 1 transmits and receives radio waves for radar measurement and outputs to the signal processing block 2 beat signals with respect to transmission waves and reception waves. A modulation counter 11 of the signal processing block 2 performs counting to cause a DA converter 10 to generate a triangular wave signal, and outputs the counted value to the DA converter 10. The DA converter 10 converts the counted value into an analog voltage signal, and supplies the analog voltage signal to a VCO (voltage controlled oscillator) 8 of the RF block 1. Then, FM modulation is performed on transmission waves. In other words, an oscillation signal of the VCO 8 is supplied to a primary radiator 4 via an isolator 7, a coupler 6, and a circulator 5. The primary radiator 4 is disposed on a focal plane of a dielectric lens 3 or in a position near the focal plane. The dielectric lens 3 transmits, as a sharp beam, a millimeter wave signal emitted from the primary radiator 4. When a reflection wave from a target (a vehicle or the like) enters the primary radiator 4 via the dielectric lens 3, a reception signal is guided to a mixer 9 via the circulator 5. The reception signal and a local signal, which is a part of a transmission signal from the coupler 6, are input to the mixer 9. The mixer 9 outputs, as an intermediate-frequency signal, a beat signal corresponding to a signal indicating the frequency difference between the reception signal and the local signal to an AD converter 12 of the signal processing block 2. The AD converter 12 converts the intermediate-frequency signal into digital data. A DSP (digital signal processor) 13 performs FFT (fast Fourier transform) on a data string input from the AD converter 12, and calculates the relative distance and the relative speed of the target, as described later.

A scan unit 16 in the RF block 1 performs parallel displacement of the primary radiator 4 on a focal plane of the dielectric lens 3 or on a plane parallel to the focal plane. A 0 dB coupler is formed between a movable portion in which the primary radiator 4 is provided and a fixed portion. A motor M is a driving motor for the scan unit 16. The motor performs beam scanning over a range between −10 degrees and +10 degrees in a cycle of, for example, 100 milliseconds.

A microprocessor 14 in the signal processing block 2 controls the modulation counter 11 and the scan unit 16. The microprocessor 14 controls a beam direction to be set to a predetermined angle with respect to the scan unit 16 and controls the modulation counter 11 to cause the VCO 8 to perform modulation using a triangular wave. The microprocessor 14 extracts a pair (pairing) of a projecting portion appearing in a frequency spectrum in an upstream-modulation section and a projecting portion appearing in a frequency spectrum in a downstream-modulation section that are calculated by the DSP 13. In addition, the microprocessor 14 calculates the relative distance and the relative speed of a target in accordance with a method, which will be described later, and outputs the calculated relative distance and relative speed to a host apparatus, which is not shown in the drawing.

Figure 2:
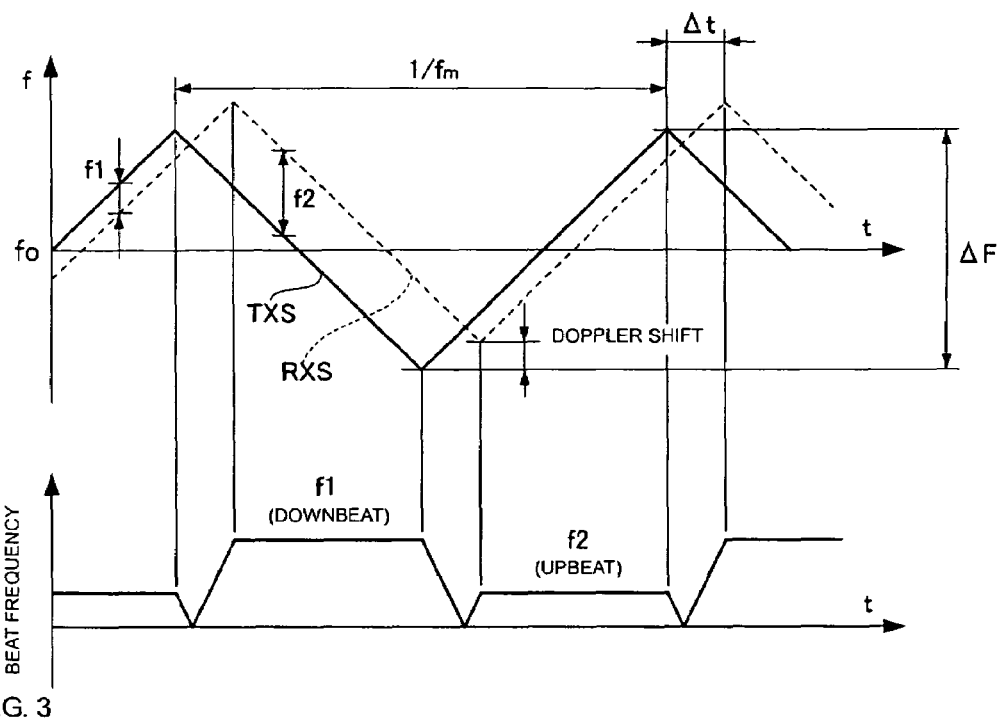
FIG. 2 illustrates an example of beat signals in an upstream-modulation section and a downstream-modulation section of the radar.

FIG. 2 shows an example of a difference between a frequency change of a transmission signal and a frequency change of a reception signal, the difference being caused by the distance to a target and a relative speed. A transmission signal TXS is a signal on which frequency modulation is performed so as to be in a triangular waveform in which a center frequency fo is the center of the frequency. The frequency difference between the transmission signal TXS and a reception signal RXS when the frequency of the transmission signal TXS increases is equal to a frequency f1 of an upbeat signal, and the frequency difference between the transmission signal TXS and the reception signal RXS when the frequency of the transmission signal TXS decreases is equal to a frequency f2 of a downbeat signal. Here, ΔF represents the width of a frequency shift. The difference Δt on the time axis (time difference) between the triangular waveform of the transmission signal TXS and the triangular waveform of the reception signal RXS corresponds to a period of time necessary for a radio wave to go back and forth between an antenna and the target. The difference on the frequency axis between the transmission signal TXS and the reception signal RXS is equal to the amount of Doppler shift, and the difference is caused by the relative speed of the target with respect to the antenna. The time difference and the amount of Doppler shift change the frequency f1 of the upbeat signal and the frequency f2 of the downbeat signal. The distance from the radar to the target and the relative speed of the target with respect to the radar are calculated by detecting the frequencies f1 and f2. In other words, when fr represents a frequency component based on a range delay and fd represents a Doppler shift frequency component based on relative speed, the following relationship is achieved:

$$fr = (f1 + f2)/2 \quad (1)$$

$$fd = (f2 - f1)/2 \quad (2).$$

Figure 3:
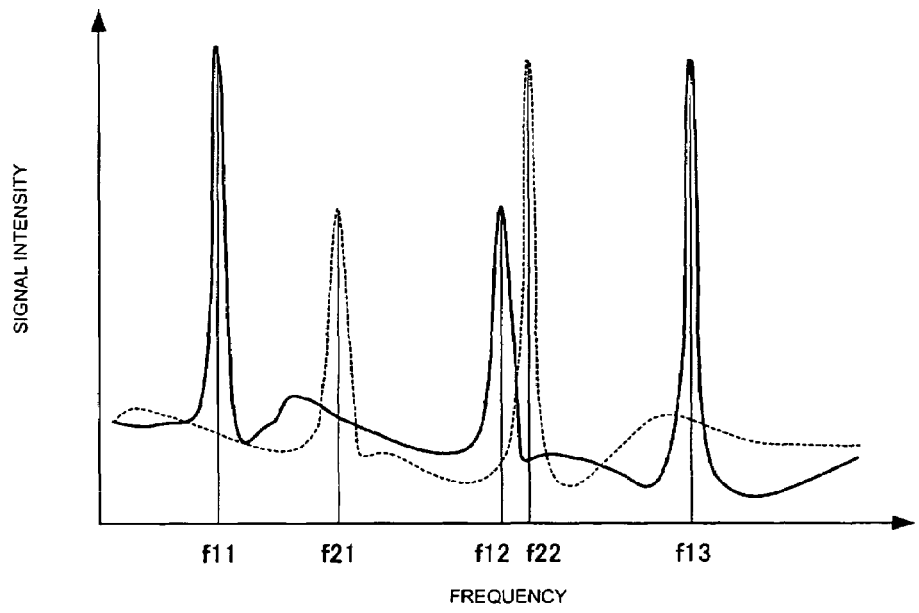
FIG. 3 illustrates an example of frequency spectra of beat signals in an upstream-modulation section and a downstream-modulation section.

FIG. 3 shows an example of a frequency spectrum of a beat signal in each of an upstream-modulation section and a downstream-modulation section. In this example, the solid line represents the frequency spectrum of the beat signal in the upstream-modulation section, and the broken line represents the frequency spectrum of the beat signal in the downstream-modulation section. In the frequency range shown in FIG. 3, three projecting portions, that is, peak frequencies f11, f12, and f13, appear in the beat signal in the upstream-modulation section, and two projecting portions, that is, peak frequencies f21 and f22, appear in the beat signal in the downstream-modulation section. Pairing is performed for a plurality of projecting portions. Using a pair of peak frequencies, the relative distance to a target is calculated in accordance with condition (1), and the relative speed of the target is calculated in accordance with condition (2). For example, when the peak frequencies f13 and f22 are regarded as forming a pair, a frequency component fr based on a range delay is calculated from the condition fr=(f13+ f22)/2, and a Doppler shift frequency component fd by a speed difference is calculated from the condition fd=(f22−f13)/2.

As shown in FIG. 2, when fo represents a transmission center frequency, 1/fm represents a modulation cycle, ΔF represents the width of a frequency shift, if a target at a distance R approaches at a relative speed V, a range delay component fr included in beat signals is represented by the relationship:

$$fr=(4fm\Delta F \cdot R)/C \quad (3).$$

Thus, the distance R is calculated from the condition:

$$R=Cfr/(4fm\Delta F) \quad (4).$$

In addition, a frequency component fd based on a Doppler shift included in beat signals is represented by the relationship:

$$fd=(2Vfo)/C \quad (5).$$

Thus, the relative speed V is calculated from the condition:

$$V=Cfd/(2fo) \quad (6).$$

In addition, the frequency resolution of FFT performed in each of the upstream-modulation section and the downstream-modulation section is 2fm, which is the fundamental frequency of each of the sections. When δR represents a corresponding range resolution and δV represents a corresponding speed resolution, by substituting conditions R=δR, fr=2fm, V=δV, and fd=2fm for conditions (4) and (6), the following conditions are obtained:

$$\delta R=C/2\Delta F \quad (7);$$

and $$\delta V=fm \cdot C/fo \quad (8).$$

The upbeat frequency f1 and the downbeat frequency f2 are represented as follows:

$$f1=fr-fd \quad (9);$$

and $$f2=fr+fd \quad (10).$$

Thus, when τ represents the time represented by the following relationship, if a target performs linear motion with constant velocity, frequencies f1 and f2 obtained at a certain time correspond to a frequency fr at a time τ after or τ before the corresponding time.

$$\tau=\delta R/\delta V=fo/(2fm\Delta F) \quad (11)$$

This relationship will be explained with reference to FIGS. 4 and 5.

When a measurement cycle T is set so as to satisfy the relationship nT=τ, a frequency component fr based on a range delay of a target at a measurement timing after measurement is performed n times can be predicted at a desired timing. For example, a frequency component fr at time t is equal to a beat frequency f1 in an upstream-modulation section at time t−nT.

Thus, processing of "calculating a distance by always regarding f1 n times before as fr at the current time" is considered. However, the relative speed of a target cannot be calculated by only this processing. In addition, when the target suddenly accelerates or decelerates or when a difference from a condition nT≈τ increases, an error in distance measurement correspondingly increases.

In contrast, as described above, normal FMCW radars are capable of acquiring relative distance and relative speed at the same time by pairing beat frequencies f1 and f2 in an upstream-modulation section and a downstream-modulation section obtained by measurement at a certain time. However, if a plurality of targets exists, a plurality of frequencies f1 and f2 exist. Thus, if pairing is not performed accurately, a distance and a speed that are completely different from true values may be output.

The present invention calculates the distance and relative speed of a target in accordance with the procedure described below and solves all the above-mentioned problems at the same time.

(1) A beat frequency f1 in an upstream-modulation section at time t−nT is set as a predicted distance f1prd at time t.

(2) From among beat frequencies f1 and f2 in an upstream-modulation section and a downstream-modulation section at time t, pair candidates f1 and f2 that satisfy the condition (f1prd−ε)<(f1+f2)/2<(f1prd+ε) are acquired. Here, ε represents a constant that is appropriately set based on a possible error.

(3) From among pairs acquired in processing (2), a pair candidate not including f2prd that satisfies f2−f1≈f2prd−f1prd is excluded from the acquired pair candidates. Here, f2prd is a beat frequency in the downstream-modulation section at time t.

(4) From among pairs acquired in processing (3), one or more possible pairs are selected taken into consideration various other conditions used for pairing in an FMCW radar (the degree of coincidence between peak values of projecting portions appearing in frequency spectra, the degree of coincidence between peak directions obtained from profiles of angle directions of frequency spectra, and the like).

(5) In accordance with f1 and f2 selected in processing (4), fr and fd are calculated. The obtained results are substituted for conditions (4) and (6), and a relative distance R and a relative speed V are calculated.

Figure 4:
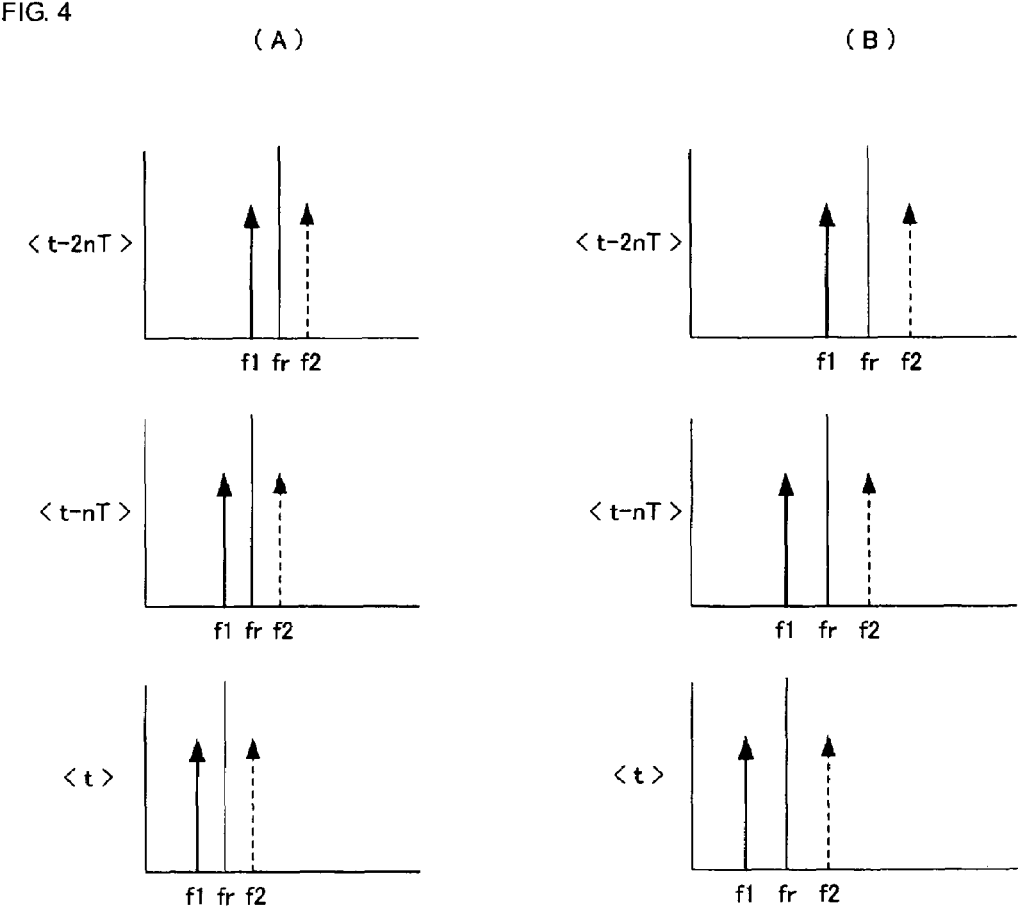
FIG. 4 illustrates examples of changes of peak frequencies and the like at various timings of a radar according to a first embodiment.

An example in which the relative speed of a target differs from each other is shown in part (A) and (B) of FIG. 4. In both cases, a frequency component fr based on a range delay at time t is substantially equal to a frequency f1 of an upbeat signal at time t−nT.

Figure 5:
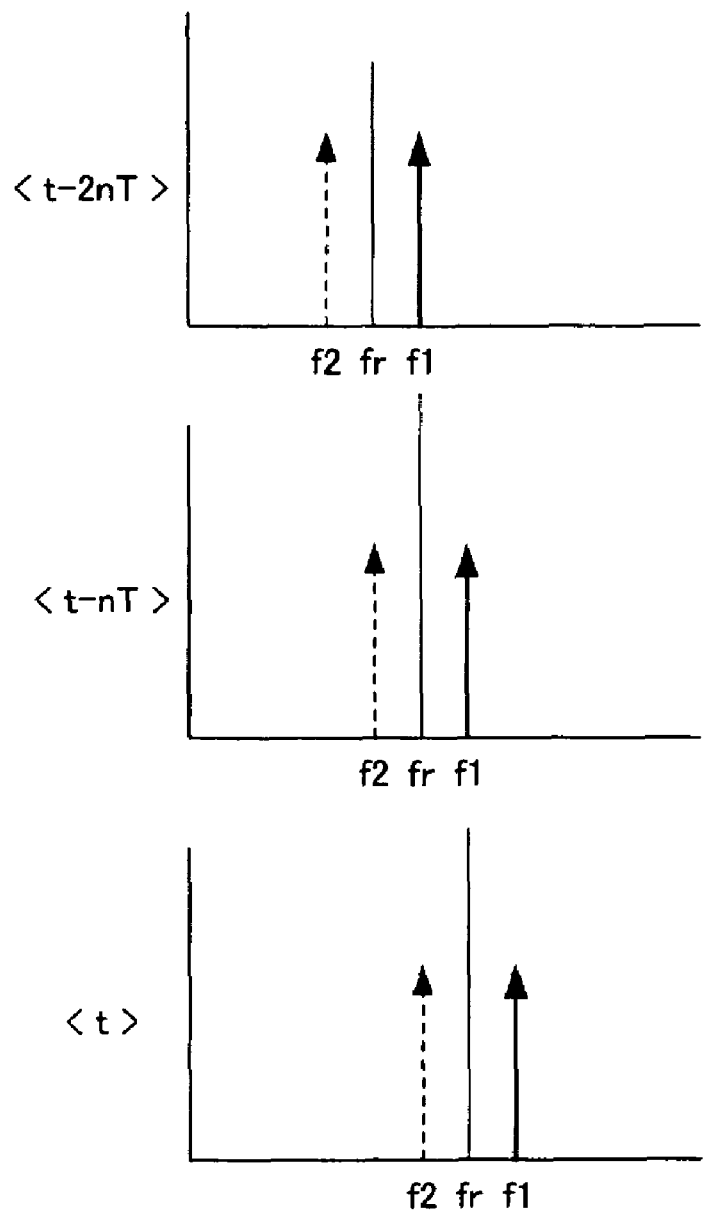
FIG. 5 illustrates examples of changes of peak frequencies and the like at various timings of the radar according to the first embodiment.

FIG. 5 shows an example of a change in a frequency f1 of an upbeat signal and a change in a frequency f2 of a downbeat signal when the target recedes from the radar. In this case, fr at time t is substantially equal to f1 at time t−nT.

Figure 6:
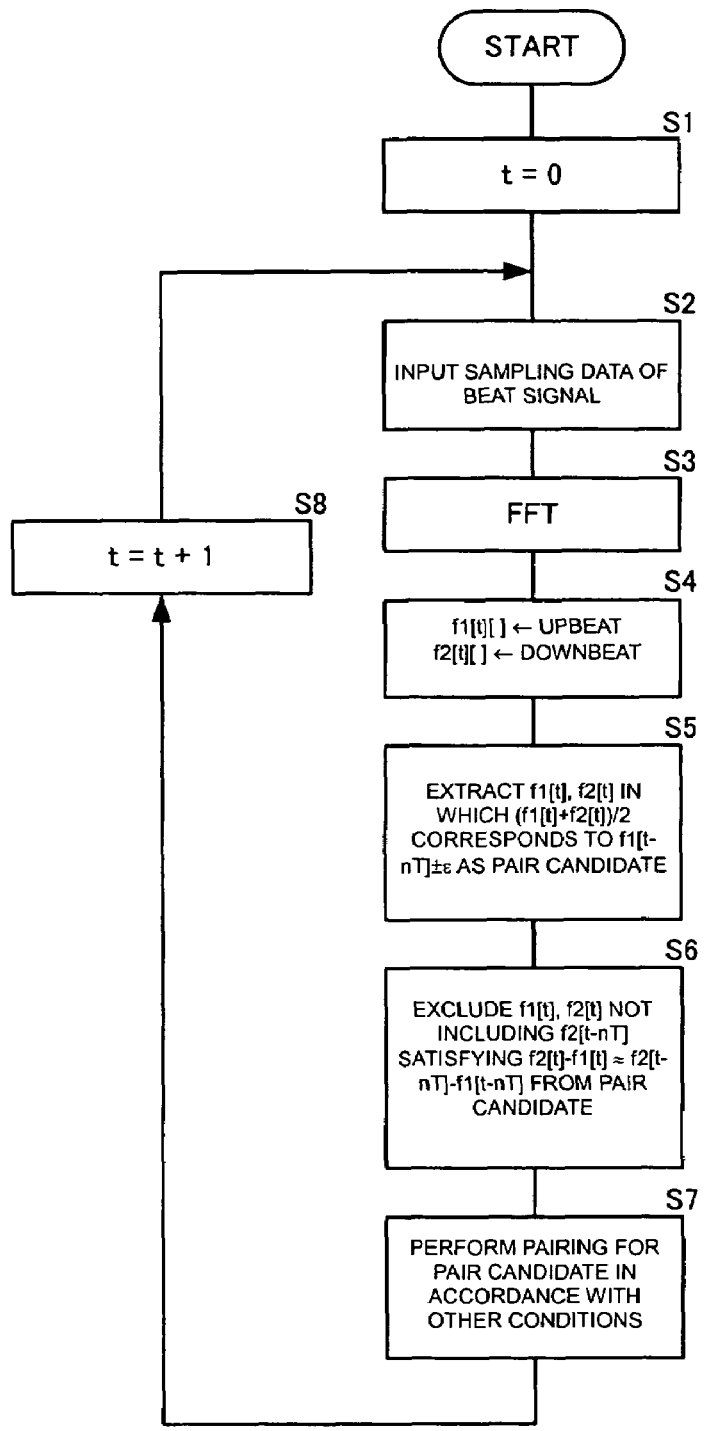
FIG. 6 is a flowchart showing a processing procedure for pairing performed by the radar.

An example of a procedure for the above-described pairing processing is shown as a flowchart in FIG. 6.

Here, t represents a variable indicating the number of measurement times. First, an initial value 0 is substituted for t (step S1). Sampling data of a beat signal is input, and an FFT arithmetic operation is performed (step S2→step S3). Then, a peak frequency of a projecting portion appearing in a frequency spectrum of an upbeat signal (hereinafter, simply referred to as a "peak frequency of an upbeat signal") and a peak frequency of a projecting portion appearing in a frequency spectrum of a downbeat signal (hereinafter, simply referred to as a "peak frequency of a downbeat signal") that are calculated by the FFT arithmetic operation are substituted for two-dimensional array variables f1[t][ ] and f2[t][ ] (step S4). In the following descriptions, in order to collectively represent a data string of peak frequencies of a plurality of projecting portions appearing in frequency spectra of an upbeat signal and a downbeat signal at each timing, a one-dimensional array format is adopted.

Then, from among a plurality of peak frequencies included in the upbeat signal and the downbeat signal, a combination of peak frequencies f1[t] and f2[t] in which (f1[t]+f2[t])/2 corresponds, within a range of ±ϵ, to a plurality of peak frequencies f1[t−nT] of an upbeat signal obtained by measurement performed nT times before is extracted as a pair candidate (step S5).

Then, a combination of f1[t] and f2[t] not including f2[t−nT] in which a difference between the peak frequency f1[t] of the upbeat signal and the peak frequency f2[t] of the downbeat signal that are obtained at the current time is substantially equal to a difference (f2[t−nT]−f1[t−nT]) between f1 and f2 at time t−nT is excluded from pair candidates (step S6). Then, the most appropriate combination is determined as a pair, taking into consideration the similarity of the peak intensity and the similarity of the peak direction (step S7).

Pairing at each measurement timing is performed by repeating the above-described processing (step S7→step S8→step S2→ . . . ).

Another processing operation for pairing in a radar according to a second embodiment of the present invention is described next with reference to FIG. 7.

Although fr at time t is estimated from f1 and f2 at time t−nT in the first embodiment, fr at time t−nT is estimated from f2 at time t in the second embodiment.

Figure 7:
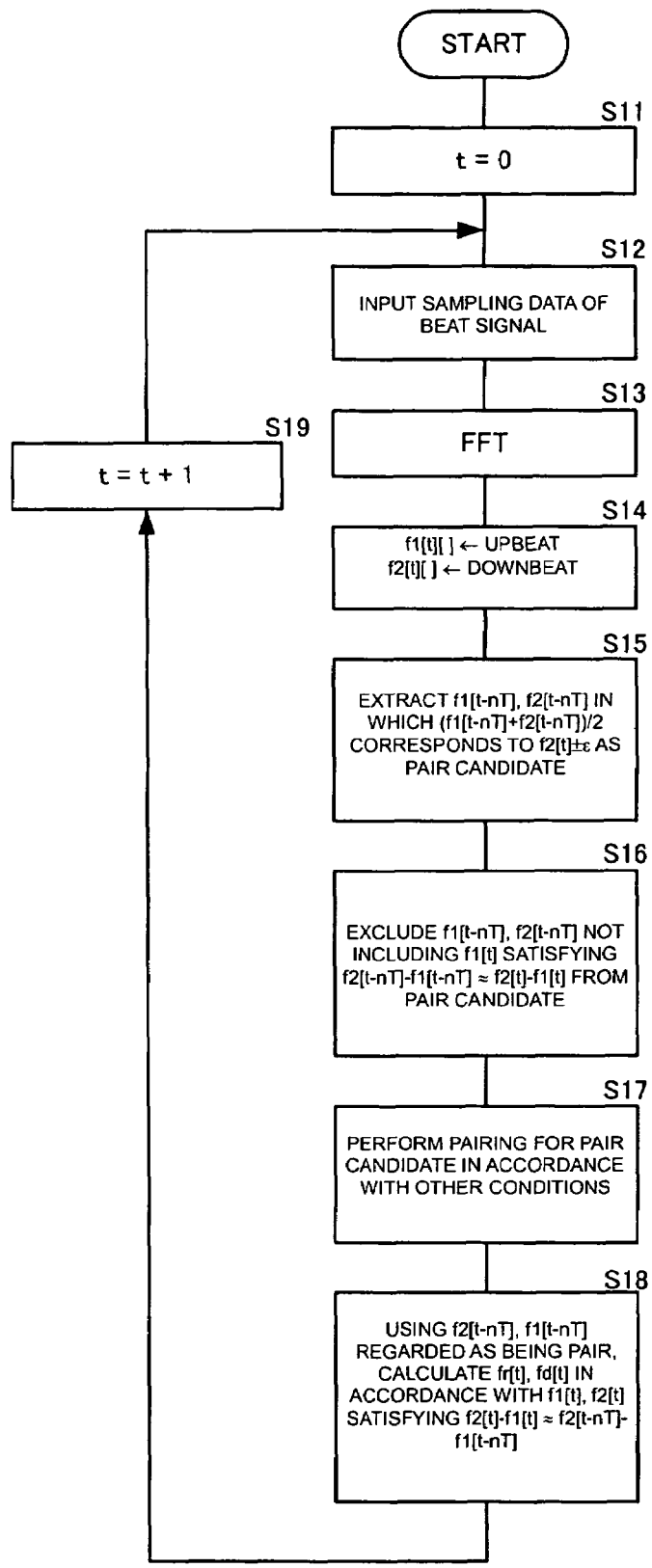
FIG. 7 is a flowchart showing a processing procedure for pairing performed by a radar according to a second embodiment.

FIG. 7 is a flowchart showing a processing procedure of the pairing operation. The processing procedure shown in FIG. 7 is different from the example shown in FIG. 6 in steps S15, S16, and S18. In step S15, from among a plurality of peak frequencies included in an upbeat signal and a downbeat signal at time t−nT, a combination of peak frequencies f1[t−nT] and f2[t−nT] in which (f1[t−nT]+f2[t−nT])/2 corresponds, within a range of ±ϵ, to a plurality of peak frequencies f2[t] of a downbeat signal obtained by the current measurement is extracted as a pair candidate.

Then, a combination of f1[t−nT] and f2[t−nT] not including f1[t] in which a difference (f2[t]−f1[t]) between a peak frequency f1 of an upbeat signal and a peak frequency f2 of a downbeat signal at time t is substantially equal to a difference (f2[t−nT]−f1[t−nT]) between f1 and f2 at time t−nT is excluded from pair candidates (step S16).

Then, the most appropriate combination is determined as a pair, taking into consideration the similarity of the peak intensity and the similarity of the peak direction (step S17).

Then, using the paired f1[t−nT] and f2[t−nT], f1[t] and f2[t] in which a Doppler shift frequency serving as a difference between f1 and f2 obtained by measurement at the current time is substantially equal to a Doppler shift frequency serving as a difference between f1 and f2 obtained by measurement at time t−nT (that is, f1[t] and f2[t] that satisfy the condition f2[t]−f1[t]≈f2[t−nT]−f1[t−nT]) are extracted, and a relative distance and a relative speed at the current measurement timing are calculated (step S18) from the following conditions:

$$fr[t]=(f1[t]+f2[t])/2;$$

and $$fd[t]=(f2[t]-f1[t])/2.$$

A radar according to a third embodiment will be described with reference to FIGS. 8 and 9.

Although cases where the measurement cycle T satisfies condition (11) are described in the first and second embodiments, a desired measurement cycle can be set in the third embodiment.

Figure 8:
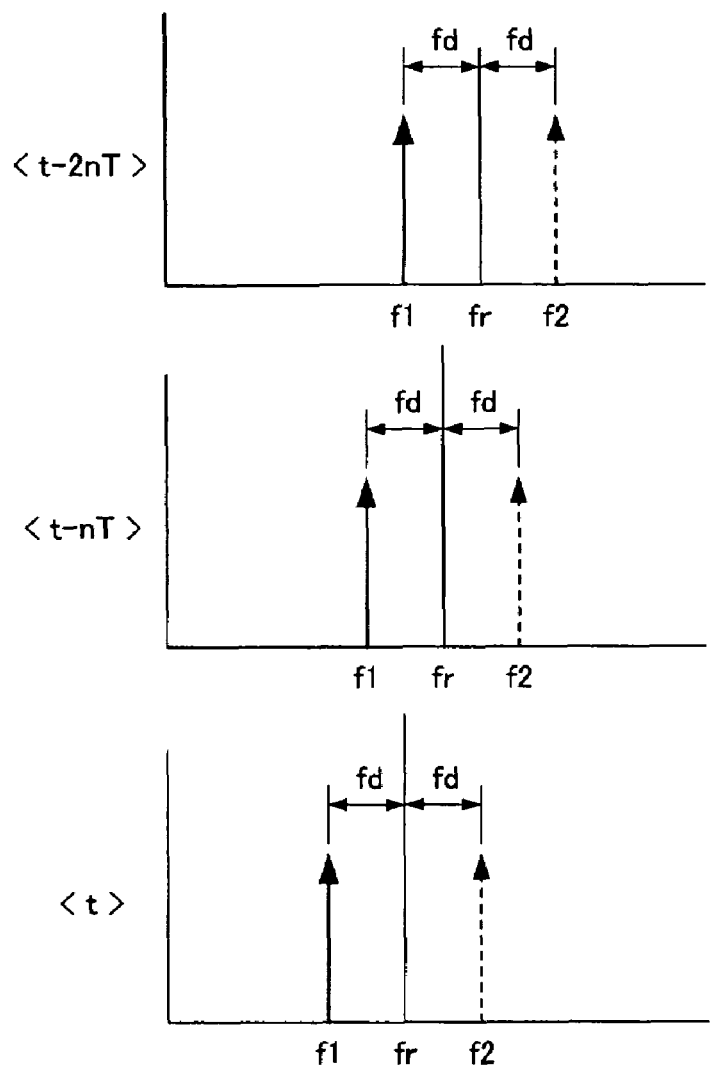
FIG. 8 illustrates examples of changes of peak frequencies and the like at various timings of a radar according to a third embodiment.

FIG. 8 shows an example of changes of a peak frequency f1 of an upbeat signal, a peak frequency f2 of a downbeat signal, and a frequency component fr based on a range delay that are obtained at measurement timings. In this example, a cycle nT does not satisfy the condition nt≈τ even if n is appropriately selected such that a difference between nT and τ is minimum, and the relationship nT<τ is achieved. Thus, f1 at a previous measurement timing t−nT does not correspond to fr at the current measurement timing t.

Figure 9:
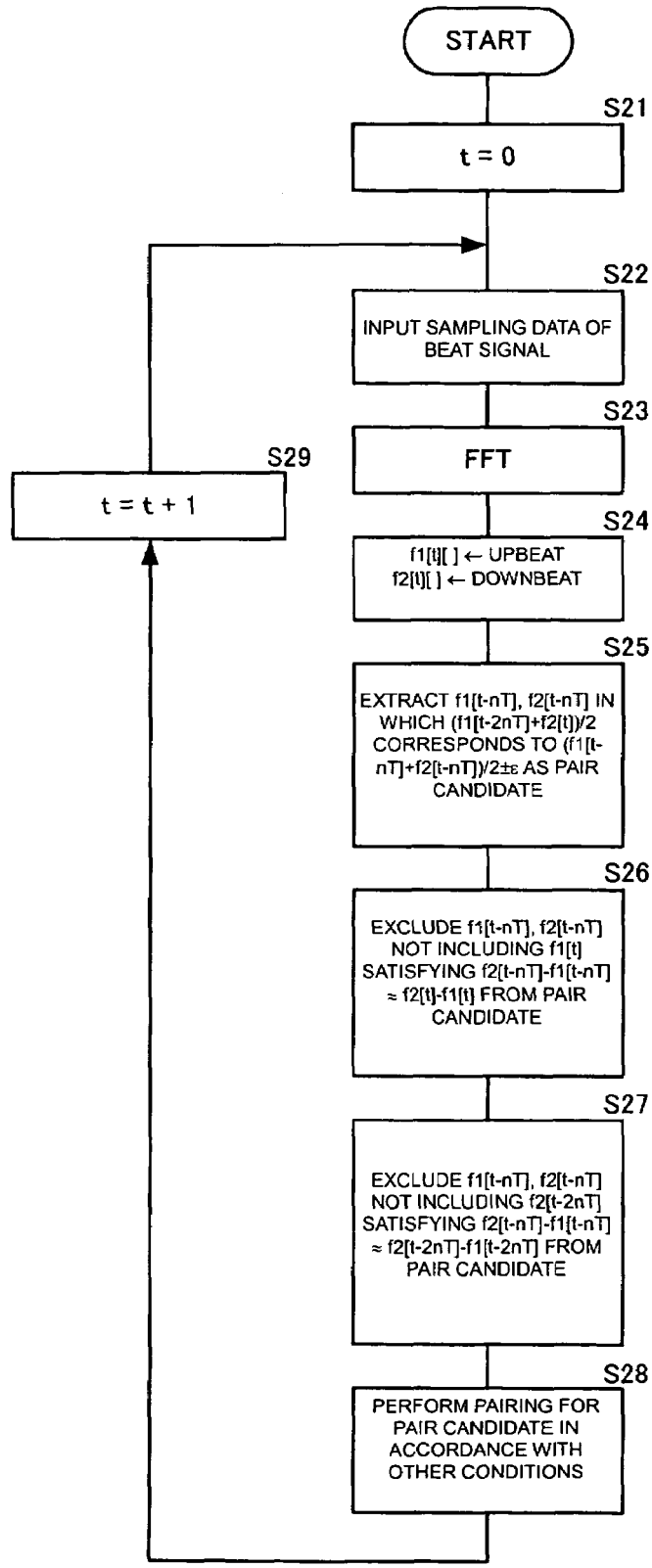
FIG. 9 is a flowchart showing a processing procedure for pairing performed by the radar.

FIG. 9 is a flowchart showing a processing procedure for pairing in the radar according to the third embodiment. The processing procedure shown in FIG. 9 is different from the procedure shown in FIG. 6 in steps S25 to S27. In step S25, f2 at the current time t that is the nearest to f1 at time t−2nT is selected, and f1 and f2 at time t−nT in which the average of f1 and f2 corresponds, within a range of ±ϵ, to fr at time t−nT (that is, (f1[t−2nT]+f2[t])/2)) are extracted as a pair candidate.

Then, a combination of f1[t−nT] and f2[t−nT] not including f1[t] in which a difference (f2[t]−f1[t]) between a peak frequency f1 of an upbeat signal and a peak frequency f2 of a downbeat signal at time t is substantially equal to a difference (f2[t−nT]−f1[t−nT]) between f1 and f2 at time t−nT is excluded from pair candidates (step S26).

In addition, similarly, a combination of f1[t−nT] and f2[t−nT] not including f2[t−2nT] in which a difference (f2[t−2nT]−f1[t−2nT]) between a peak frequency f1 of an upbeat signal and a peak frequency f2 of a downbeat signal at time t−2nT is substantially equal to a difference (f2[t−nT]−f1[t−nT]) between f1 and f2 at time t−nT is excluded from pair candidates (step S27).

Accordingly, fr at time t−nT is estimated from f2 at time t and f1 at time t−2nT, a pair in which a frequency component based on a range delay satisfies the estimated fr is extracted as a pair candidate, and a combination of a pair in which a Doppler shift frequency that is substantially equal to a Doppler shift frequency component fd[t−nT] calculated from the extracted pair exists at a measurement timing of time t or time t−2nT is extracted. Accordingly, a pair candidate at time t−nT is extracted.

In order to calculate fr and fd at time t, as in the processing of step S18 shown in FIG. 7, f1[t] and f2[t] in which a Doppler shift frequency serving as a difference between f1 and f2 obtained by the current measurement is substantially equal to a Doppler shift frequency serving as a difference between f1 and f2 obtained by measurement at time t−nT (that is, f1[t] and f2[t] that satisfy the condition f2[t]−f1[t] ≈f2[t−nT]−f1[t−nT]) are extracted using f1[t−nT] and f2[t−nT] regarded as being a pair, and a distance and a relative speed at the current measurement timing are calculated from the following conditions:

$$fr[t]=(f1[t]+f2[t])/2;$$

and $$fd[t]=(f2[t]-f1[t])/2.$$

The invention claimed is:

1. A radar comprising:
   a transmitter transmitting a transmission signal having an alternately repeating upstream-modulation section in which a frequency gradually increases and a downstream-modulation section in which the frequency gradually decreases;
   a receiver receiving a reception signal serving that is a reflection signal of the transmission signal reflected from a target;

an analyzer acquiring data on a frequency spectrum of a beat signal for the transmission signal and the reception signal;

an extractor extracting, from among a plurality of first projecting portions appearing in the frequency spectrum of the beat signal in the upstream-modulation section and a plurality of second projecting portions appearing in the frequency spectrum of the beat signal in the downstream-modulation section, a pair of projecting portions resulting from reflection of the transmission signal by the target; and a detector detecting a distance to the target and a relative speed with respect to the target in accordance with frequencies of the extracted pair of projecting portions, wherein the extractor further predicting a center frequency of peak frequencies of the first and second projecting portions at a point in time after a predetermined time based on a peak frequency of the first projecting portion at the predetermined time, and extracting the pair of projecting portions acquired at the point in time in accordance with the center frequency.

2. A radar comprising:

a transmitter transmitting a transmission signal having an alternately repeating upstream-modulation section in which a frequency gradually increases and a downstream-modulation section in which the frequency gradually decreases;

a receiver receiving a reception signal serving that is a reflection signal of the transmission signal reflected from a target;

an analyzer acquiring data on a frequency spectrum of a beat signal for the transmission signal and the reception signal;

an extractor extracting, from among a plurality of first projecting portions appearing in the frequency spectrum of the beat signal in the upstream-modulation section and a plurality of second projecting portions appearing in the frequency spectrum of the beat signal in the downstream-modulation section, a pair of projecting portions resulting from reflection of the transmission signal by the target; and a detector detecting a distance to the target and a relative speed with respect to the target in accordance with frequencies of the extracted pair of projecting portions, wherein the extractor further predicting a center frequency of peak frequencies of the first and second projecting portions at a point in time before a predetermined time based on a peak frequency of the second projecting portion at the predetermined time, and extracting the pair of projecting portions acquired at the point in time in accordance with the center frequency.

3. The radar according to claim 1, wherein the extractor extracts the pair of projecting portions by using, as the point in time, nT satisfying a relationship, $nT \approx fo/(2\Delta F \cdot fm)$, wherein n represents a natural number, T represents a measurement cycle in which frequency analysis is performed, 1/fm represents a modulation cycle including the upstream-modulation section and the downstream-modulation section, fo represents a center frequency of the transmission signal, and $\Delta F$ represents a width of a frequency shift in the upstream-modulation section and the downstream-modulation section.

4. A radar comprising:

a transmitter transmitting a transmission signal having an alternately repeating upstream-modulation section in which a frequency gradually increases and a downstream-modulation section in which the frequency gradually decreases;

a receiver receiving a reception signal serving that is a reflection signal of the transmission signal reflected from a target;

an analyzer acquiring data on a frequency spectrum of a beat signal for the transmission signal and the reception signal;

an extractor extracting, from among a plurality of first projecting portions appearing in the frequency spectrum of the beat signal in the upstream-modulation section and a plurality of second projecting portions appearing in the frequency spectrum of the beat signal in the downstream-modulation section, a pair of projecting portions resulting from reflection of the transmission signal by the target; and a detector detecting a distance to the target and a relative speed with respect to the target in accordance with frequencies of the extracted pair of projecting portions, wherein the extractor further predicting a center frequency of peak frequencies of the first and second projecting portions at a predetermined time by using the peak frequency of the first projecting portion at a first point in time before the predetermined time and the peak frequency of the second projecting portion at a second point in time after the predetermined time, and extracting the pair of projecting portions acquired at the predetermined time in accordance with the center frequency.

5. The radar according to claim 4, wherein, the extractor excludes a combination of the first and second projecting portions at the predetermined time from pair candidates:

when a second projecting portion forming the pair with the first projecting portion at the first point in time that is used for predicting the center frequency and that exhibits a frequency difference substantially equal to a difference between the peak frequencies of the first and second projecting portions forming the pair at the predetermined time does not exist, and/or when a first projecting portion forming the pair with the second projecting portion at the second point in time that is used for predicting the center frequency and that exhibits the frequency difference does not exist.

6. The radar according to claim 2, wherein the extractor extracts the pair of projecting portions by using, as the point in time, nT satisfying a relationship, $nT \approx fo/(2\Delta F \cdot fm)$, wherein n represents a natural number, T represents a measurement cycle in which frequency analysis is performed, 1/fm represents a modulation cycle including the upstream-modulation section and the downstream-modulation section, fo represents a center frequency of the transmission signal, and $\Delta F$ represents a width of a frequency shift in the upstream-modulation section and the downstream-modulation section.

7. The radar according to claim 1, wherein, the extractor excludes a combination of the first and second projecting portions at the point in time from pair candidates:

when a second projecting portion forming the pair with the first projecting portion at the predetermined time that is used for predicting the center frequency and that exhibits a frequency difference substantially equal to a difference between the peak frequencies of the first and second projecting portions forming the pair at the point in time does not exist.

8. The radar according to claim 7, wherein
the extractor extracts the pair of projecting portions by using, as the point in time, nT satisfying a relationship, nT≈fo/(2ΔF·fm), wherein n represents a natural number, T represents a measurement cycle in which frequency analysis is performed, 1/fm represents a modulation cycle including the upstream-modulation section and the downstream-modulation section, fo represents a center frequency of the transmission signal, and ΔF represents a width of a frequency shift in the upstream-modulation section and the downstream-modulation section.

9. The radar according to claim 2, wherein,
the extractor excludes a combination of the first and second projecting portions at the point in time from pair candidates:
when a first projecting portion forming the pair with the second projecting portion at the predetermined time that is used for predicting the center frequency and that exhibits a frequency difference substantially equal to a difference between the peak frequencies of the first and second projecting portions forming the pair at the point in time does not exist.

10. The radar according to claim 9, wherein
the extractor extracts the pair of projecting portions by using, as the point in time, nT satisfying a relationship, nT>fo/(2ΔF·fm), wherein n represents a natural number, T represents a measurement cycle in which frequency analysis is performed, 1/fm represents a modulation cycle including the upstream-modulation section and the downstream-modulation section, fo represents a center frequency of the transmission signal, and ΔF represents a width of a frequency shift in the upstream-modulation section and the downstream-modulation section.

* * * * *